US007509497B2

(12) United States Patent
Joy et al.

(10) Patent No.: US 7,509,497 B2
(45) Date of Patent: Mar. 24, 2009

(54) SYSTEM AND METHOD FOR PROVIDING SECURITY TO AN APPLICATION

(75) Inventors: George Joy, Kirkland, WA (US); Mukkul Dasgupta, Bellevue, WA (US); Scott Shell, Kirkland, WA (US); Yadhu Gopalan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 868 days.

(21) Appl. No.: 10/874,830

(22) Filed: Jun. 23, 2004

(65) Prior Publication Data

US 2005/0289348 A1  Dec. 29, 2005

(51) Int. Cl.
*G06F 21/00* (2006.01)
(52) U.S. Cl. .......................................... 713/172; 726/9
(58) Field of Classification Search .................. 713/185, 713/159, 161, 168, 176, 172
See application file for complete search history.

(56) References Cited

U.S. PATENT DOCUMENTS

| | | | | |
|---|---|---|---|---|
| 5,941,947 | A * | 8/1999 | Brown et al. ................. | 709/225 |
| 6,151,590 | A * | 11/2000 | Cordery et al. ............... | 705/60 |
| 6,397,261 | B1 * | 5/2002 | Eldridge et al. ............. | 713/171 |
| 6,571,335 | B1 * | 5/2003 | O'Donnell et al. .......... | 713/173 |
| 6,810,525 | B1 * | 10/2004 | Safadi et al. ................... | 725/1 |
| 7,010,600 | B1 * | 3/2006 | Prasad et al. ................. | 709/225 |
| 7,194,664 | B1 * | 3/2007 | Fung et al. ..................... | 714/45 |
| 2002/0026578 | A1 * | 2/2002 | Hamann et al. ............. | 713/159 |
| 2002/0099952 | A1 * | 7/2002 | Lambert et al. ............. | 713/200 |
| 2002/0124170 | A1 * | 9/2002 | Johnson, Jr. ................. | 713/176 |
| 2003/0033535 | A1 * | 2/2003 | Fisher et al. ................. | 713/185 |
| 2004/0064708 | A1 * | 4/2004 | Angelo et al. ............... | 713/185 |
| 2004/0078604 | A1 * | 4/2004 | Rice et al. .................... | 713/202 |
| 2004/0117615 | A1 * | 6/2004 | O'Donnell et al. .......... | 713/155 |
| 2005/0138388 | A1 * | 6/2005 | Paganetti et al. ............ | 713/185 |

OTHER PUBLICATIONS

Blezard, D.J. et al., "One User, One Password: Integrating Unix Accounts and Active Directory", *SIGUCCS*, 2002, 5-8.
Evered, M., "Bracket Capabilities for Distributed Systems Security", *Twenty-Fifth Australasian Computer Science Conference, Conference in Research and Practice in Information Technology*, 2002, 4, 51-58.
Gaines, R.S. et al., "Some Security Principles and Their Application to Computer Security", The Rand Corporation, Santa Monica, CA, 19-28.
Greenwald, S.J., "A New Security Policy for Distributed Resource Management and Access Control", *ACM New Security Paradigm Workshop*, 1996, 74-86.
Shockley, W.R., "Identification and Authentication when Users have Multiple Accounts", *Association for Computing Machinery*, 1993, 185-191.

* cited by examiner

*Primary Examiner*—Gilberto Barron, Jr.
*Assistant Examiner*—Samson B Lemma
(74) *Attorney, Agent, or Firm*—Woodcock Washburn LLP

(57) ABSTRACT

The present invention provides an efficient application oriented security model. Prior to execution, an application is authenticated, and security information associated with the application is retrieved. The security information is then used to generate a token that is attached to the application. The security information may include a principle account associated with the application, a list of group accounts, and a corresponding privilege list.

19 Claims, 9 Drawing Sheets

(Prior Art)

SYSTEM AND METHOD FOR PROVIDING SECURITY TO AN APPLICATION

FIELD OF THE INVENTION

The present invention relates to the field of electronic security, and, more specifically, to an application oriented security model.

BACKGROUND OF THE INVENTION

As individuals and enterprises become more dependent on the use of electronic computing devices, there is an increasing need to provide security for electronic applications and their data. Users of computing devices must feel confident that their private data will not be exposed to other, unauthorized persons or groups. Moreover, providers of electronic services must also feel confident that applications which are used in connection with their services will not be corrupted by other applications from other providers. Such corruption may result in poor service quality or in a complete failure to provide the service, thereby inconveniencing the customer and tarnishing the reputation of the service provider.

In traditional desktop computing environments, most applications are either provided by a single developer or are specially designed to function and cooperate with applications from other developers. For example, in desktop, environments, common applications such as a word processor, a spreadsheet, an electronic mail application, and an Internet browser are often designed by a single developer. Additionally, even if designed by different developers, there is generally a mutual trust that desktop applications will function efficiently with one another. Accordingly, desktop security concerns generally are primarily focused on untrusted users accessing a system rather than on untrusted applications within the system. Thus, desktop security systems generally invoke user oriented security models.

In an exemplary desktop security model, each user or group of users has a corresponding security account. When a user logs on to a computing device or network of computing devices, the user enters a password to authenticate his identity. A token is then generated for the user that includes the user's corresponding accounts and privileges. A privilege is the right of an account to perform various system related operations such as, for example, shutting down the system, loading device drivers, and changing the system time. An exemplary prior art token 100 is shown in FIG. 1. Token 100 includes a user account entry 102, which includes the user's account, and a group account list 104, which includes the accounts of every group of which the user is a member. Token 100 also includes a privilege list 106, which lists each of the user's associated privileges.

The token is used to determine whether its corresponding user is authorized access to secure objects within the system. Specifically, each secure object within the system has a discretionary access control list (DACL), that identifies the access rights of each account with respect to the secure object. The DACL has a number of entries, referred to as access control entries (ACE's), each specifying the access rights of a particular account. An exemplary prior art DACL 210 is shown in FIG. 2. DACL 210 includes ACE's 212-216. User tokens 100 and 101 are both attempting to gain access to secure object 200. User token 100 has been denied access to secure object 200 because, as indicated by ACE 212, Andrew does not have access to secure object 200. The denied access of token 100 is represented by the dashed line shown in FIG. 2. By contrast, user token 101 has been granted access to secure object 200 because, as indicated by ACE 214, Group A has write access secure object 200.

Unlike desktop computers, portable computing devices such as, for example, cellular phones and personal data assistants (PDA's) generally include a number of different applications from a number of different service providers. For example, a single cellular phone may include applications from a telephone service provider, a software provider, and a company which issues the phone to an employee. Service providers and companies tend to have concerns of allowing untrusted applications to be executed on devices which are on their networks or connected to their enterprise systems. Accordingly, user oriented security models, such as the one set forth above, are not ideal for portable devices because user oriented security models do not necessarily protect one application and its data from other applications running on the system. Accordingly, there is a need in the art for an efficient application oriented security model. The present invention satisfies these and other needs.

SUMMARY OF THE INVENTION

The present invention is directed to systems and methods for providing security to an application. Prior to execution of an application, the application is authenticated based on authentication associated with the application. The authentication information may be, for example, a digital signature. Once the application is authenticated, security information associated with the application is retrieved. The security information may include a privilege list that identifies global resources which the application is authorized to access. The security information may also include a principal account associated with the application. The security information may also include a list of group accounts of which the application is a member. Once identified, the security information is included in a token that is generated for the application. The application is then launched and its corresponding token is attached.

According to an aspect of the invention, the attached token may be used to determine whether the application is authorized to access a resource on the system. Upon receiving a request to access the resource, the privilege list within the token is examined. If the selected resource is included within the privilege list, then the application is authorized to access the resource.

According to another aspect of the invention, the attached token may be used to determine whether the application is authorized to access a secured object on the system. Upon receiving a request to access the object, the principal account and the list of group accounts within the token are retrieved. The retrieved accounts are then referenced against an access control list for the object to determine if the application is authorized to access the object.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different acts or elements similar to the ones described in this document, in conjunction with other present or future technologies.

As set forth above, the present invention provides an application oriented security model rather than a user oriented security model. The present invention is, therefore, well suited for, but is not limited to, embedded systems on portable computing devices such as, for example, cellular phones and personal data assistants (PDA's). Such devices tend to feature a number of different applications from a number of different providers. In accordance with the present invention, each participating application within a system is assigned a principal security account. The principal security account is analogous to individual user accounts in a user oriented model. Additionally, just as individual users may be members of a number of group accounts, each application may be a member of one or more group accounts.

Figure 1:
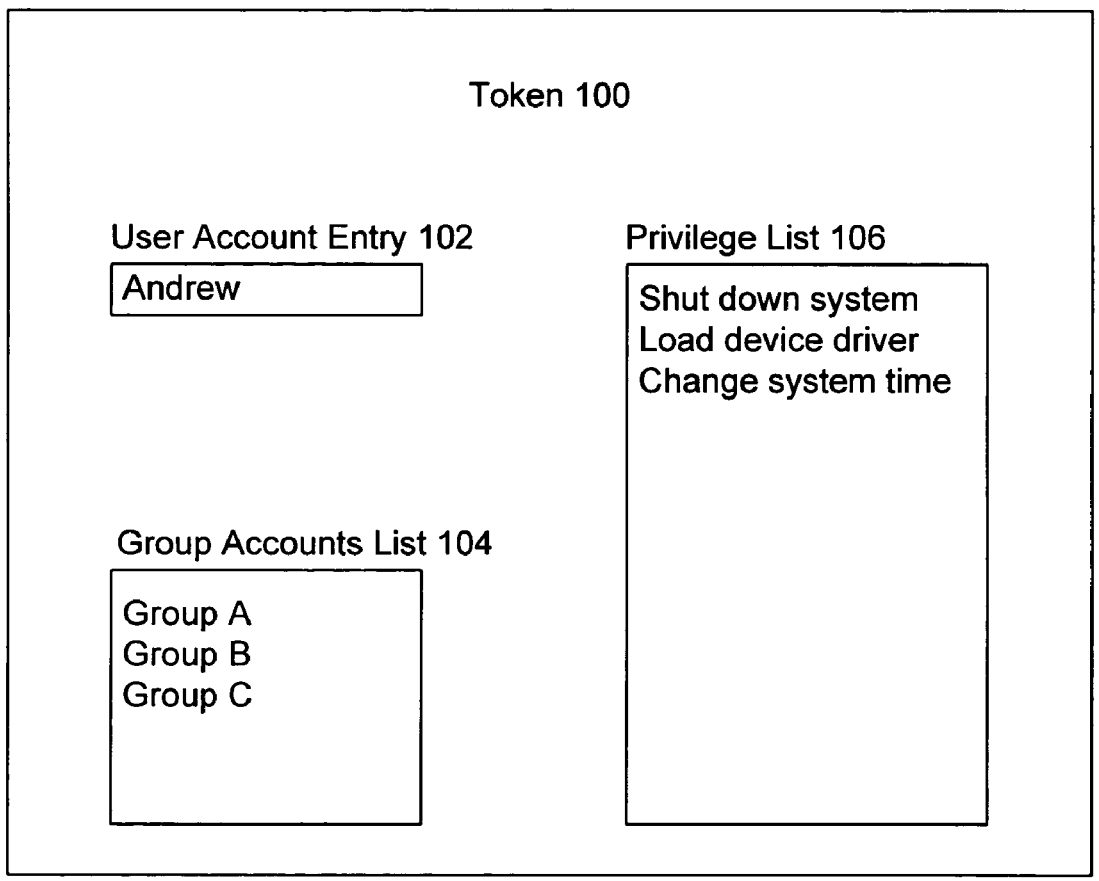
FIG. 1 depicts a prior art user token.
Figure 2:
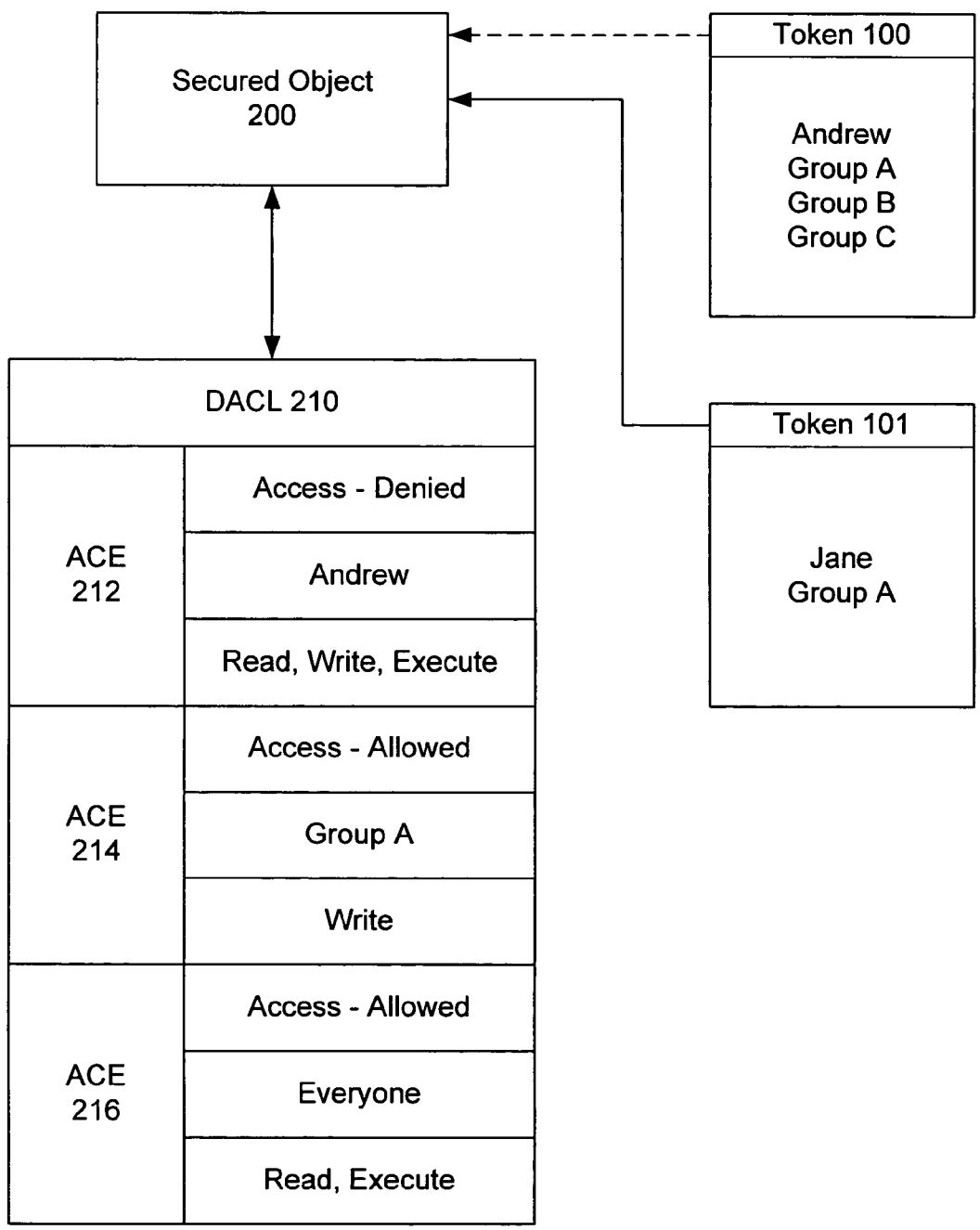
FIG. 2 depicts a prior art discretionary access control list.
Figure 3:
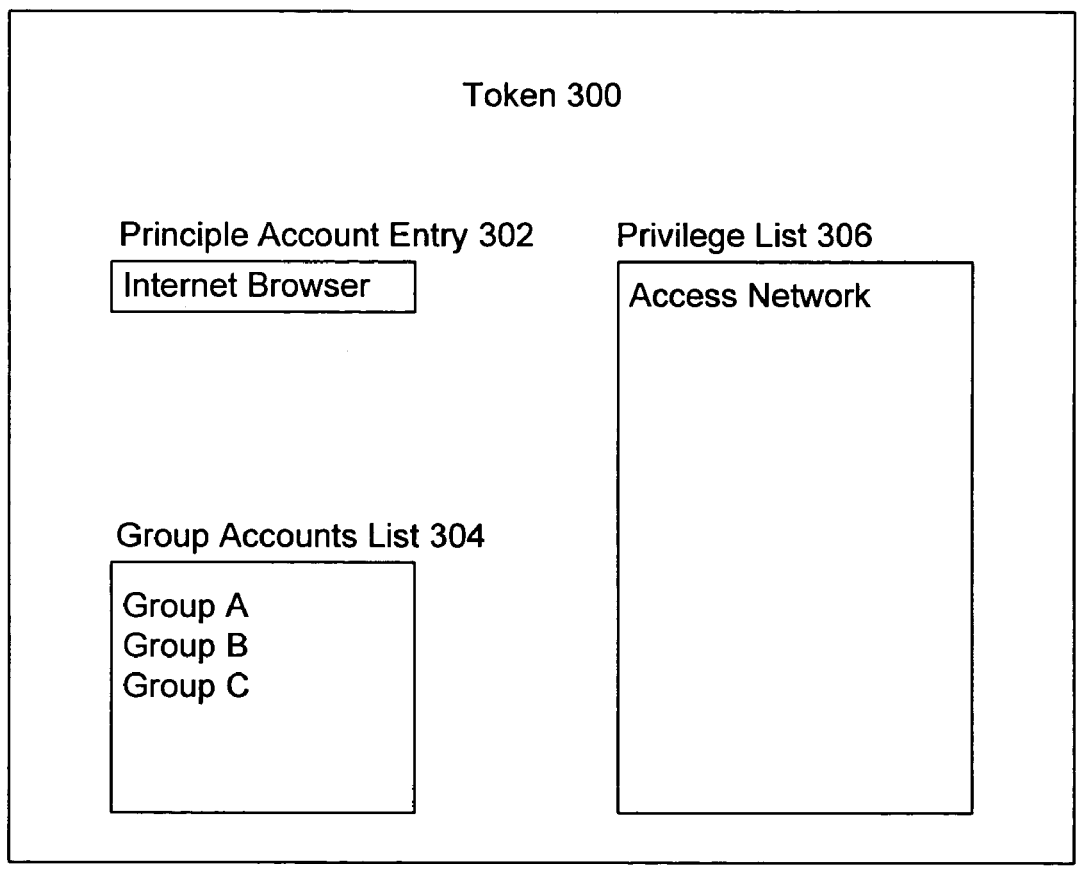
FIG. 3 depicts an exemplary application token in accordance with the present invention.

Prior to execution, an application is authenticated using authentication information associated with the application. Once authenticated, an application token is generated and attached to the application. The application is then launched with the attached token. The token has the application's security information, which may include the application's corresponding accounts and privileges. In the application oriented context, a privilege is the right of an application to access global resources such as, for example, accessing the network, accessing disk drives, etc. An exemplary application token 300 in accordance with the present invention is shown in FIG. 3. Token 300 includes a principal account entry 302, which includes the application's principal account, and a group account list 304, which includes the accounts of every group of which the application is a member. Token 300 also includes a privilege list 306, which lists each of the account's associated privileges. Token 300 is used to provide security for its corresponding application, as will be described in detail below.

Figure 4:
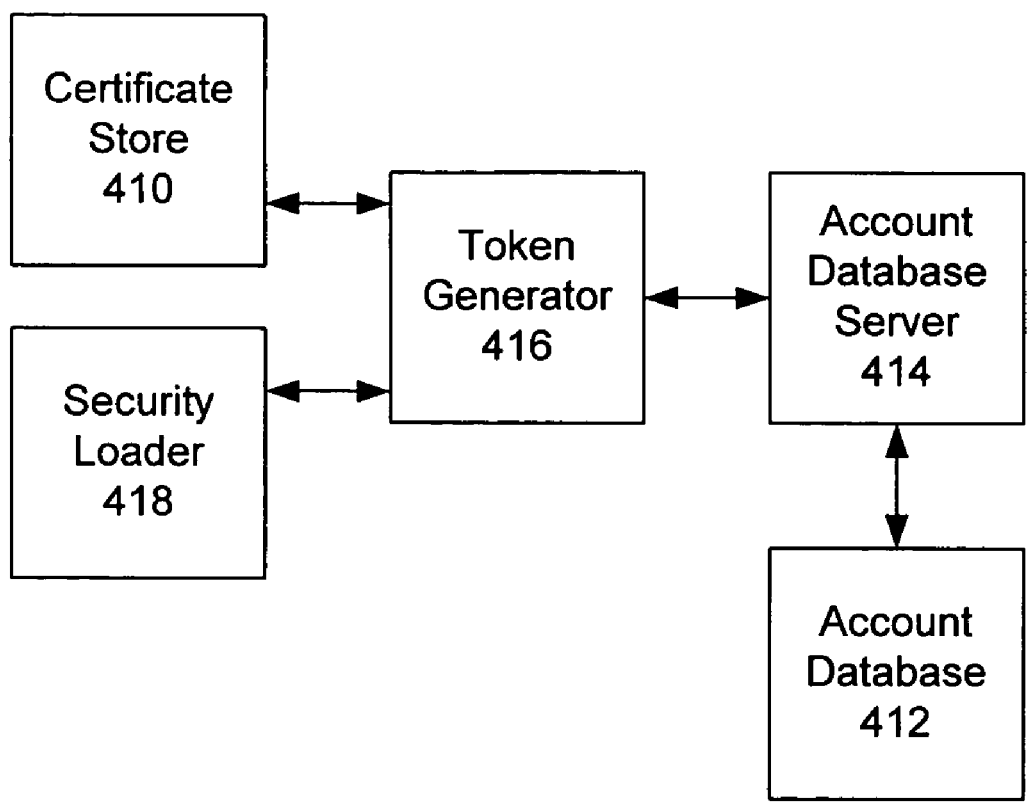
FIG. 4 is a block diagram of an exemplary system for providing security to an application in accordance with the present invention.

A block diagram of an exemplary system for providing security to an application in accordance with the present invention is shown in FIG. 4. Generally, certificate store 410 stores certificates of signing authorities, which are used to authenticate the identity of applications. Account database 412 stores security information, which may include a list of applications and their corresponding principal accounts, group accounts, and privileges. Account database server 414 provides an interface to account database 412. Token generator 416 generates application tokens including the application security information stored in account database 412. Security loader 418 attaches tokens to their corresponding applications.

Figure 5:
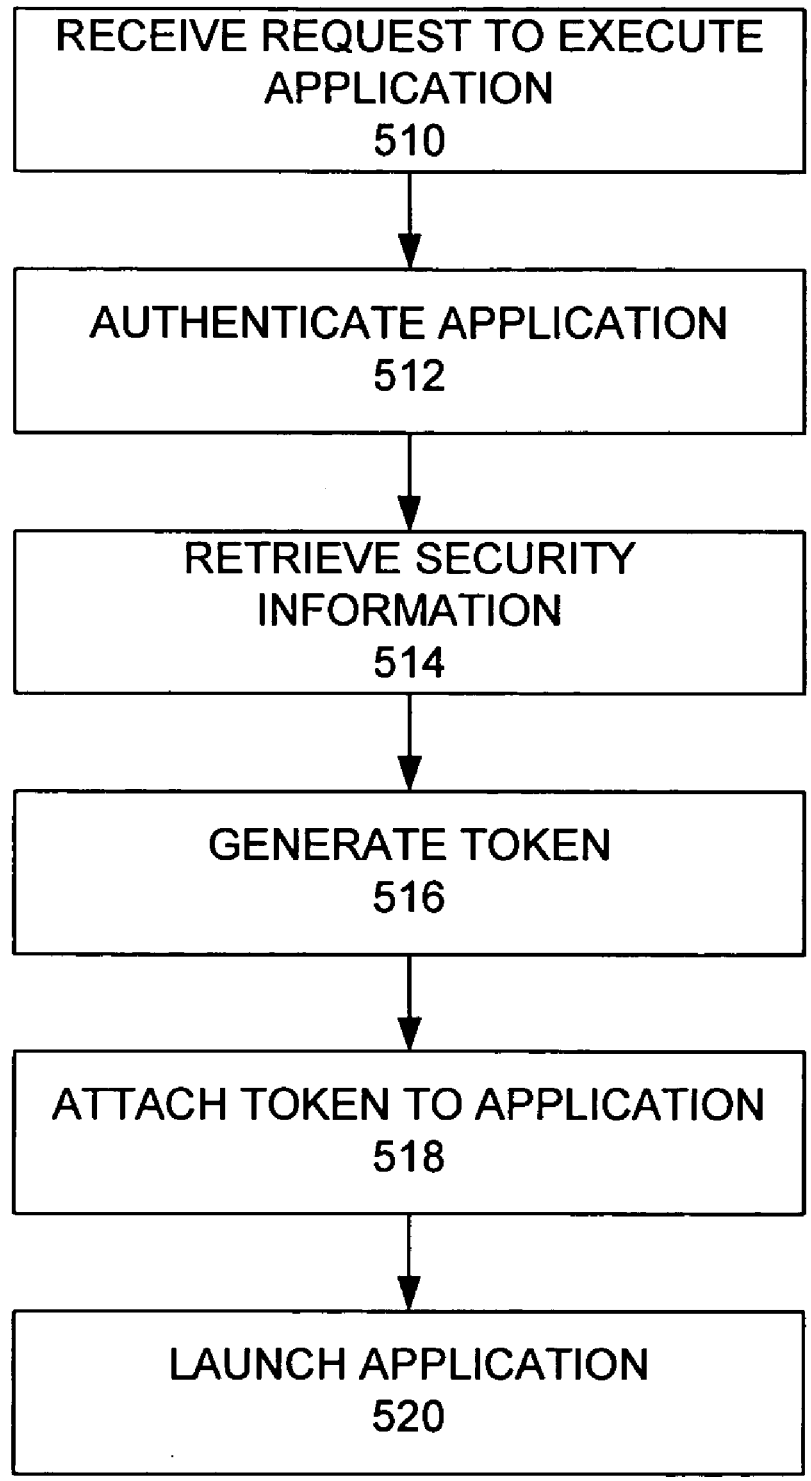
FIG. 5 is a flowchart of an exemplary method for providing security to an application in accordance with the present invention.

A flowchart of an exemplary method for providing security to an application in accordance with the present invention is shown in FIG. 5. At step 510, a request is received to execute an application. At step 512, prior to executing the application, the identity of the application is authenticated based on authentication information associated with the application. For example, the application may have an associated digital signature. Token generator 416 may retrieve the digital signature from the application and may also retrieve a corresponding digital certificate from certificate store 410. The digital certificate is from an authorized certificate authority and is used to authenticate the digital signature.

At step 514, token generator 416 retrieves the application's corresponding security information. The security information may be retrieved from account database 412 via account database server 414. As discussed above, the security information may include a principal account, a list of group accounts, and an associated list of privileges. At step 516, the application token is generated. The application token includes the application's corresponding security information. At step 518, security loader 418 attaches the token to the application. At step 520, the application is launched with its attached token.

As should be appreciated, all applications within the system need not have a specific corresponding token and need not necessarily use the method of FIG. 4. For example, if an application that is being executed is in the modules section, then a default token may be generated and assigned to the application. The default token may include, for example, a group account corresponding to a system level security group.

Figure 6:
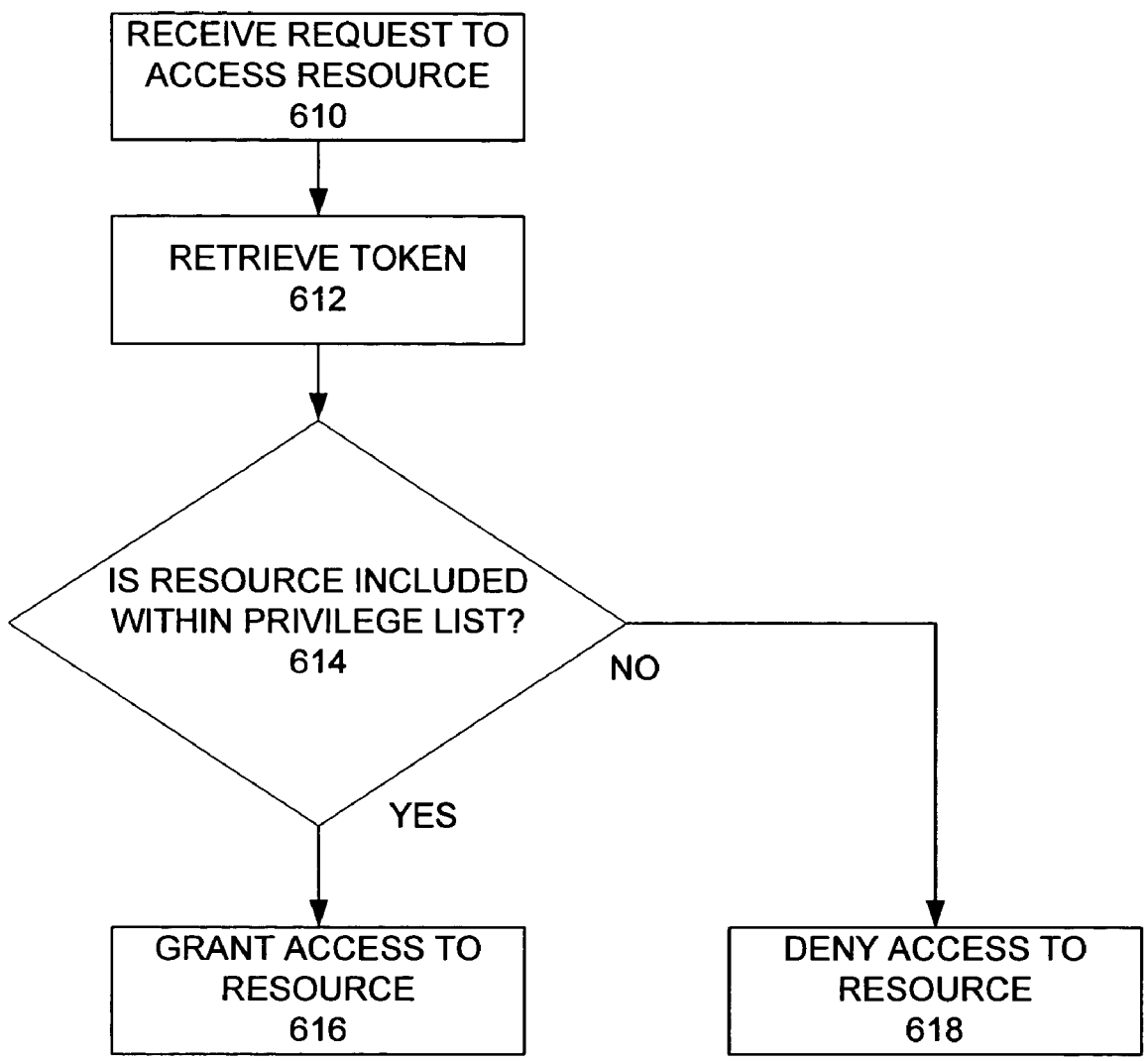
FIG. 6 is a flowchart of an exemplary method for authorizing an application to access a resource in accordance with the present invention.

A flowchart of an exemplary method for authorizing an application to access a resource in accordance with the present invention is shown in FIG. 6. At step 610, a request is received for the application to access a global resource. For example, if the application is executed on a cellular telephone, the application may attempt to access a connected telephone network. At step 612, the application's corresponding token is retrieved.

At step 614, the privilege list included in the token is examined to determine if it lists the resource which the application is attempting to access. If the resource is included in the privilege list, then the application is authorized to access the resource, and, at step 616, the application is granted access to the resource. If the resource is not included in the privilege list, then the application is not authorized to access the resource, and, at step 618, the application is denied access to the resource.

Figure 7:
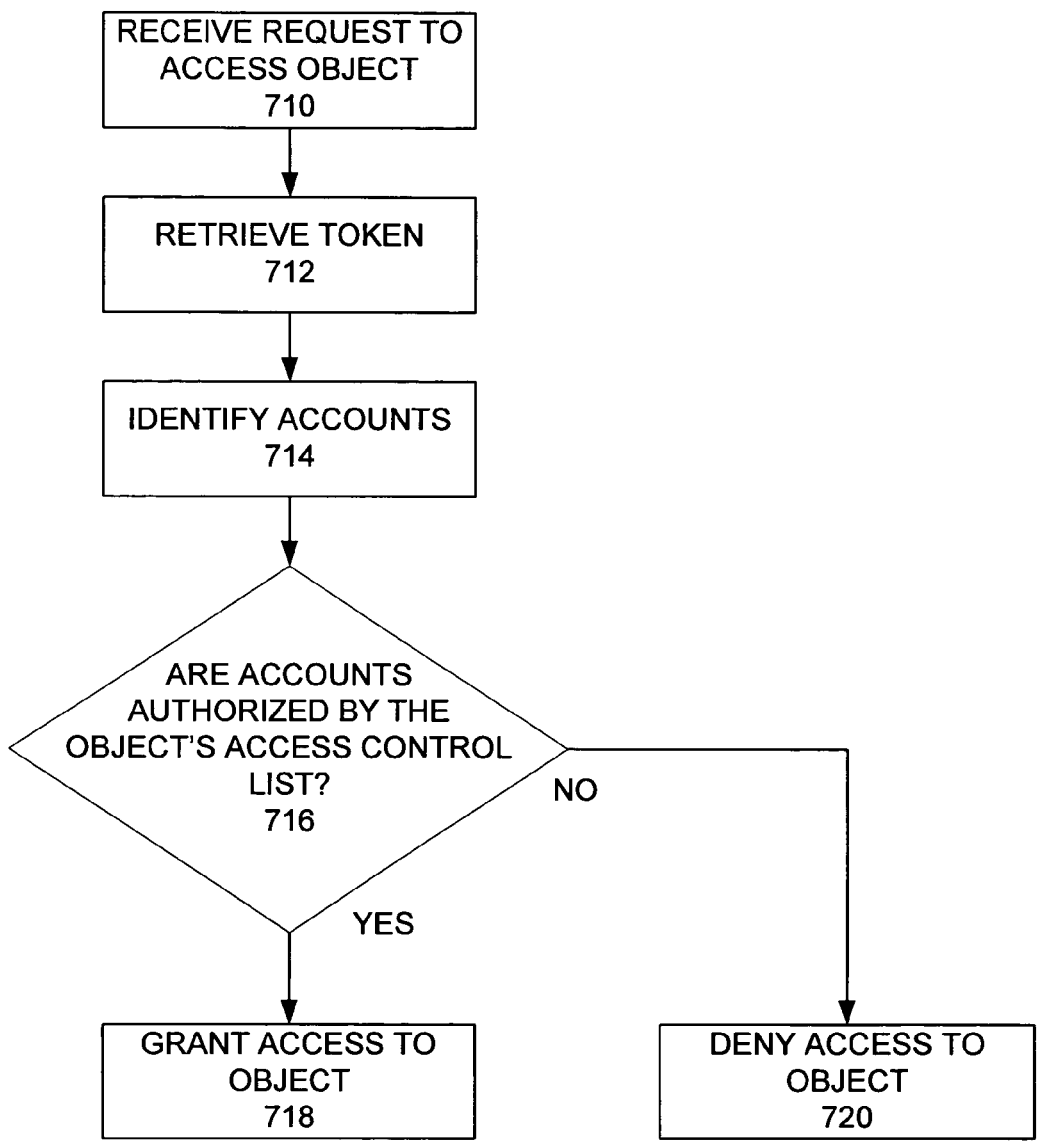
FIG. 7 is a flowchart of an exemplary method for authorizing an application to access a secure object in accordance with the present invention.

A flowchart of an exemplary method for authorizing an application to access a secure object in accordance with the present invention is shown in FIG. 7. At step 710, a request is received for the application to access a secured object. For example, an Internet browser application may want to access a file that contains saved passwords, with the file being a secured object. At step 712, the application's corresponding token is retrieved.

At step 714, the accounts listed in the token are identified. As discussed previously, the token may include a principal account and a list of group accounts of which the application is a member. At step 716, the accounts listed in the token are referenced against an access control list for the secured object to determine whether the accounts are authorized to access the secure object. The access control list for the secured object may be a discretionary access control list (DACL) that has a number of entries, referred to as access control entries (ACE's), each specifying the access rights of a particular account.

If the accounts are referenced as authorized accounts in the access control list, then, at step 718, the application is granted access to the secured object. If the accounts are not referenced as authorized accounts in the access control list, then, at step 720, the application is denied access to the secured object.

The present invention may enable one application to impersonate the security credentials of another application. This impersonation procedure is particularly useful when a server application must verify a client's access rights before allowing the client to access a secured object. To enable impersonation, the server may generate an impersonation token that impersonates the client's security credentials. The accounts within the impersonation token are identified and referenced against the access control list of the secured object, as described above with reference to FIG. 7.

The present invention may also enable a number of functions to be used with respect to the application tokens. Such functions may be analogous to a subset of the functions that are available with respect to user tokens as generated in desktop security systems. Such functions may include, for example, but not limited to, changing the group account information in a token, enabling or disabling selected privileges within the privilege list of an access token, and creating a new token that is a restricted version of an existing token.

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for persisting objects in a database store in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the object persistence methods of the present invention.

Figure 8:
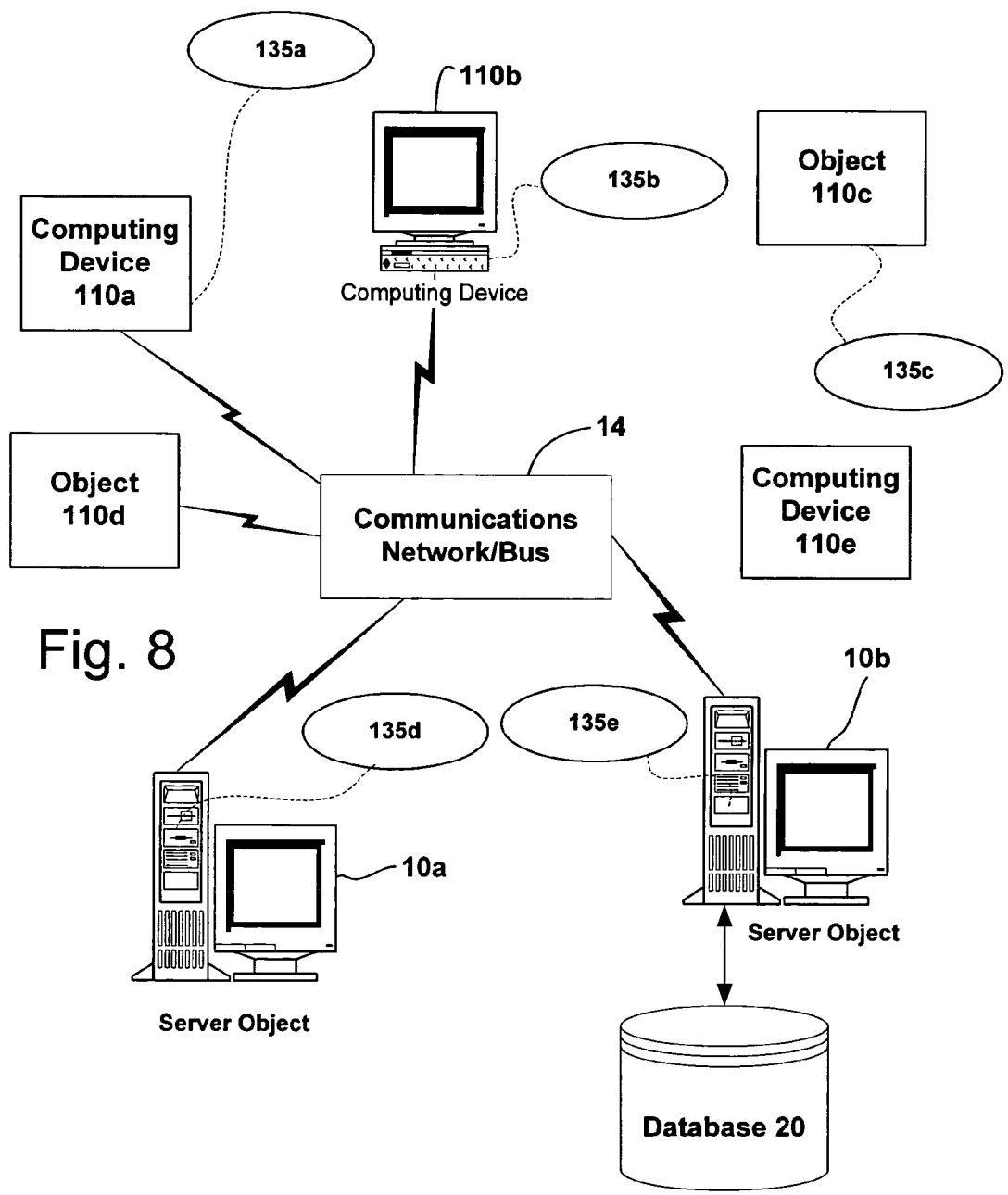
FIG. 8 is a block diagram representing an exemplary network environment having a variety of computing devices in which the present invention may be implemented.

FIG. 8 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 8, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the object persistence methods of the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 8, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the object persistence techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the persistence mechanism of the invention may be distributed across multiple computing devices.

Client(s) and server(s) may communicate with one another utilizing the functionality provided by a protocol layer. For example, Hypertext Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 8 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to maintain a persisted object.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

FIG. 8 and the following discussion are intended to provide a brief general description of a suitable computing device in connection with which the invention may be implemented. For example, any of the client and server computers or devices illustrated in FIG. 8 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

Figure 9:
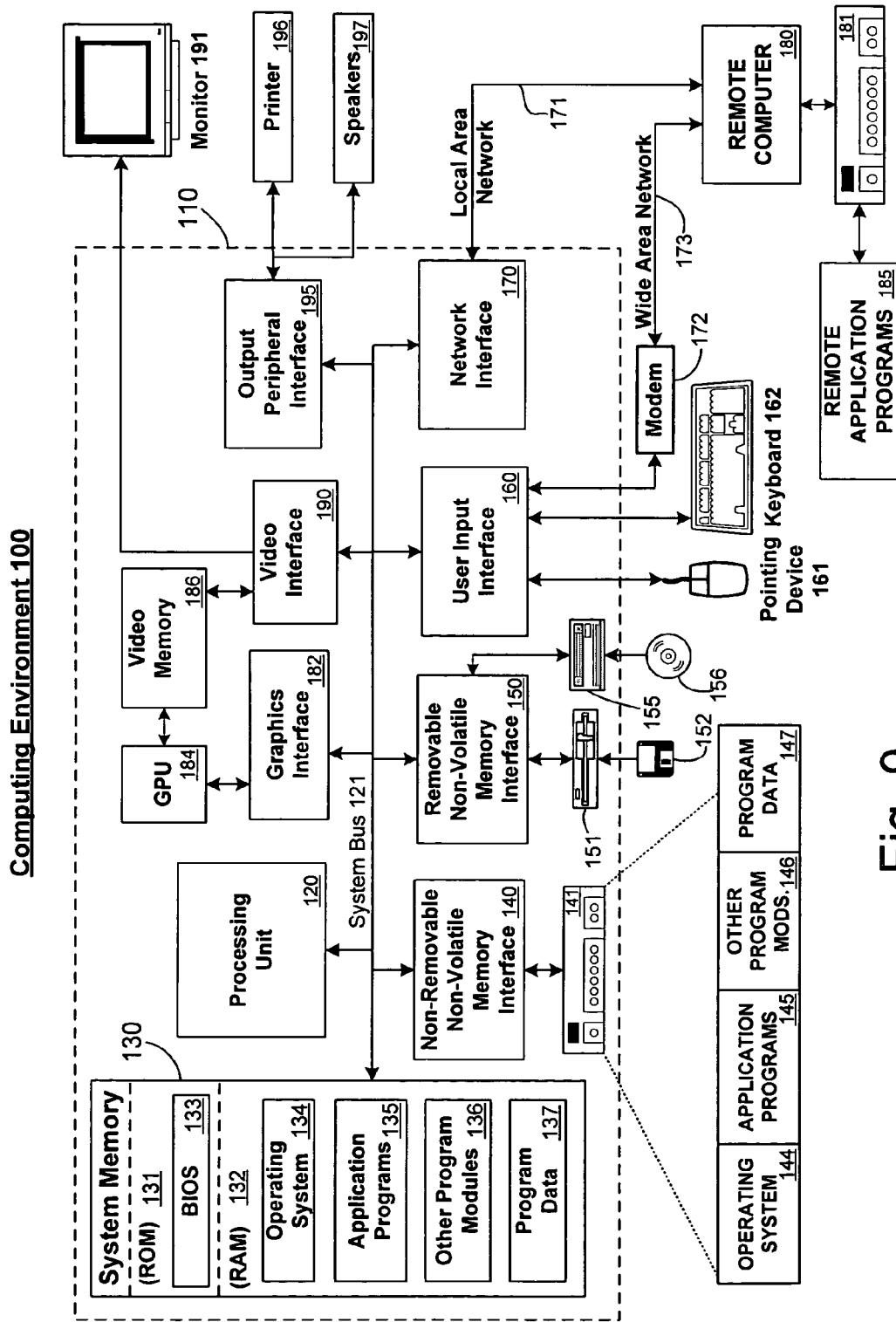
FIG. 9 is a block diagram of an exemplary representing an exemplary computing device in which the present invention may be implemented.

FIG. 9 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 9, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 9 illustrates operating system 134, application programs 135, other program modules 136, and program data 137.

The computer 110 may also include other removable/non-removable, volatile/nonvolatile computer storage media. By way of example only, FIG. 8 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 9 provide storage of computer readable instructions, data structures, program modules and other data for the computer 110. In FIG. 9 , for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 9. The logical connections depicted in FIG. 9 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 9 illustrates remote application programs 185 as residing on memory device 181. It will be appreciated that the network connections shown are exemplary and other means of establishing a communications link between the computers may be used.

CONCLUSION

Thus, systems and methods for providing security to an application have been disclosed. An application is authenticated, and security information associated with the applications is retrieved. The security information is then used to generate a token that is attached to the application. The security information may include a principle account, a list of group accounts, and a corresponding privilege list.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A method for providing security to an application, the method comprising:
   receiving a request to execute an application;
   authenticating an identity of the application based on authentication information associated with the application, the authentication information comprising a digital signature associated with the application and a digital certificate corresponding to the digital signature;
   retrieving security information associated with the application;
   generating a token that includes the security information for the application, the token comprising a principal account entry that identifies a principal security account assigned to the application and a group account list that identifies at least one group of which the application is a member;
   attaching the token to the application; and
   executing the application with the attached token.

2. The method of claim 1, comprising authenticating the application for execution on a portable computing device.

3. The method of claim 1, comprising authenticating the digital signature using the digital certificate, wherein the digital certificate is stored in a certificate store accessible by a portable computing device on which the application is executed.

4. The method of claim 1, wherein retrieving the security information comprises identifying a privilege list that includes resources which the application is authorized to access.

5. The method of claim 1, wherein retrieving the security information comprises identifying a principal account associated with the application.

6. The method of claim 1, wherein retrieving the security information comprises identifying a list of group accounts associated with the application.

7. The method of claim 1, comprising attaching the token using a security loader.

8. The method of claim 1, comprising generating an impersonation token for the application that includes security information corresponding to another application.

9. The method of claim 1, comprising retrieving the security information from an account database.

10. The method of claim 9, comprising generating the token using a token generator in connection with the account database.

11. A method for authorizing an application executed on a device to access a telephone network with which the device is in communication, the method comprising:
    retrieving a token attached to the application, the token comprising a principal account entry identifying a principal security account assigned to the application, a group account list identifying at least one group of which the application is a member, and a privilege list that lists resources that the application has rights to access;
    determining whether the telephone network is one of the resources that is included in the privilege list; and
    if the telephone network is included in the privilege list, then authorizing the application to access the telephone network.

12. The method of claim 11, further comprising denying the application to access the telephone network if the telephone network is not included in the privilege list.

13. The method of claim 11, further comprising generating the token prior to executing the application.

14. The method of claim 13, further comprising authenticating the application prior to generating the token.

15. A method for authorizing an application to access a secured object, the method comprising:
    retrieving a token attached to the application, the token comprising a principal account entry that identifies a principal security account assigned to the application and a group account list that identifies at least one group of which the application is a member;
    identifying the principal security account listed within the token; and
    determining whether an account control list for the secured object authorizes the principal security account, the account control list comprising a plurality of access control entries, each access control entry specifying access rights of a respective principal security account; and
    if the account control list for the secured object authorizes the principal security account, then granting the application access to the secured object.

16. The method of claim 15, further comprising if the account control list for the secured object does not authorize the principal security account, then denying the application access to the secured object.

17. The method of claim 15, further comprising:
identifying group accounts listed within the token; and
determining whether the account control list for the secured object authorizes the group accounts;
if the account control list for the secured object authorizes the group accounts, then granting the application access to the secured object; and
if the account control list for the secured object does not authorize the group accounts, then denying the application access to the secured object.

18. The method of claim 15, further comprising generating the token prior to executing the application.

19. The method of claim 18, further comprising authenticating the application prior to generating the token.

* * * * *